April 14, 1964     D. LABINO     3,129,083
METHOD FOR HEATING GLASS
Original Filed Oct. 20, 1953     3 Sheets-Sheet 1
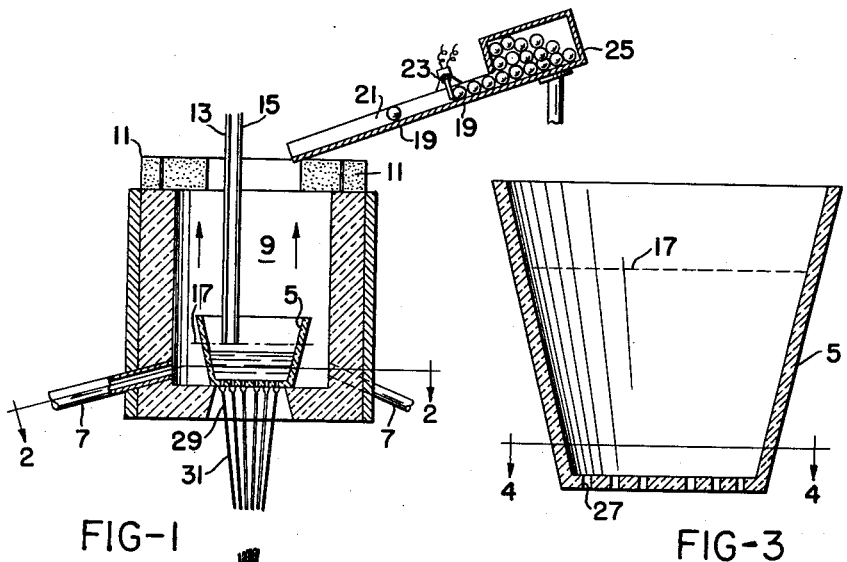
FIG-1     FIG-3
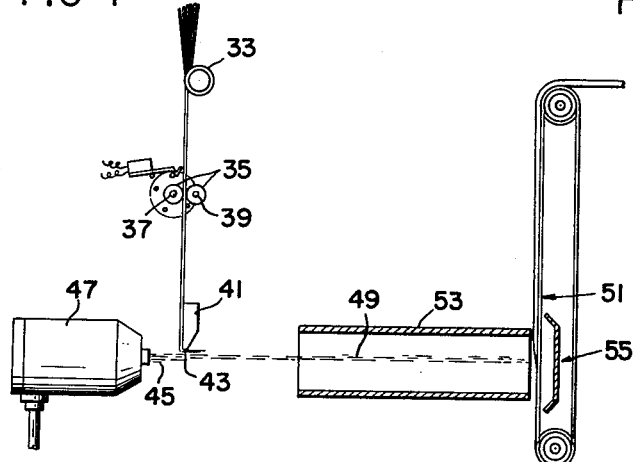
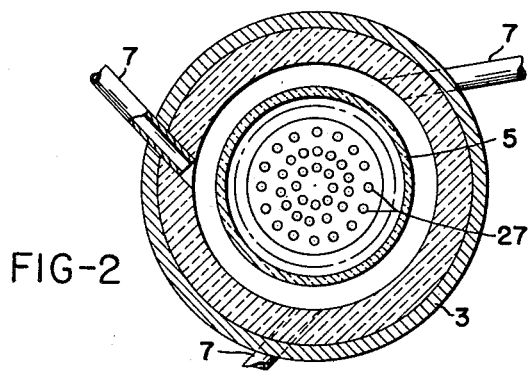
FIG-2
*INVENTOR.*
DOMINICK LABINO
BY *Toulmin & Toulmin*
ATTORNEYS

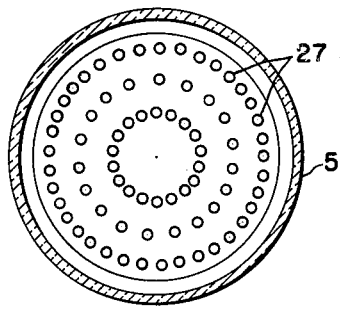
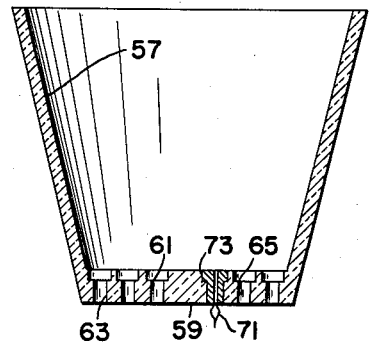
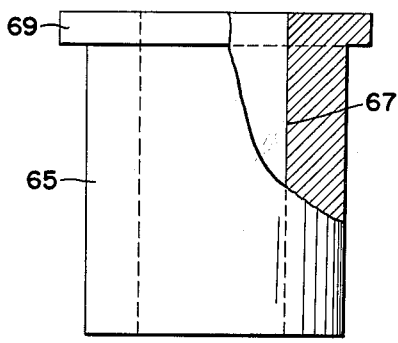
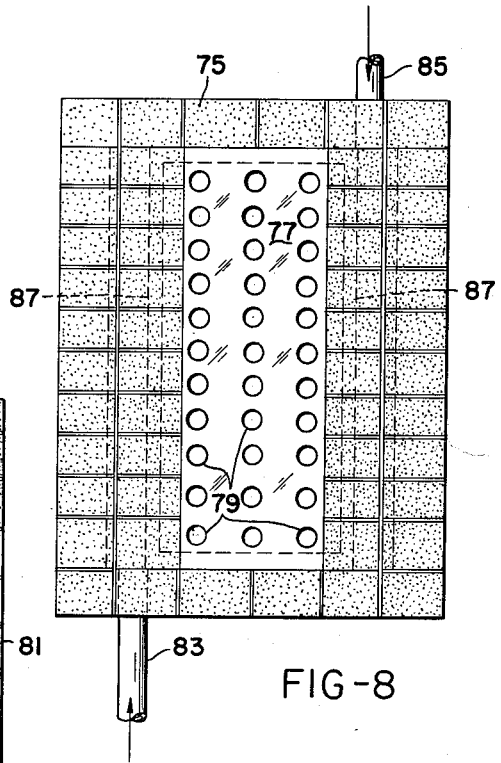

April 14, 1964 D. LABINO 3,129,083
METHOD FOR HEATING GLASS
Original Filed Oct. 20, 1953 3 Sheets-Sheet 3

INVENTOR.
DOMINICK LABINO
BY Toulmin & Toulmin
ATTORNEYS

United States Patent Office 3,129,083
Patented Apr. 14, 1964

3,129,083
METHOD FOR HEATING GLASS
Dominick Labino, Toledo, Ohio, assignor, by mesne assignments, to Johns-Manville Fiber Glass Inc., Cleveland, Ohio, a corporation of Delaware
Original application Oct. 20, 1953, Ser. No. 387,260. Divided and this application Dec. 23, 1954, Ser. No. 481,654
2 Claims. (Cl. 65—2)

This invention relates to the art of forming fine filaments and fibers of glass, and more particularly the invention relates to a method for the production of such fibers and filaments.

This application is a division of copending application, Serial No. 387,260, filed October 20, 1953.

In order to form filaments and fibers of glass it is customary to establish a supply of molten glass and to exude the same through small orifices of a metal crucible, whereupon the filaments are drawn from globules of the molten glass existing at the orifice exit, the drawing taking place either by mechanical means or by the utilization of gaseous blast or combinations thereof.

It has been usual in the art, in order to secure the required strength, chemical resistance and uniform heating conditions, to retain the supply of molten glass and to effect heating of the same within a crucible which is formed of expensive metals or alloys such as platinum, platinum-rhodium, etc., such crucibles are not useful with all types of glass, have a relatively short operating life before requiring repair, and are costly to repair. Such crucibles accordingly occasion relatively high manufacturing costs.

The production of fine filaments of glass is a process which imposes stringent requirements on the glass itself as well as the equipment utilized.

Thus the viscosity of the glass must be so controlled that the glass streams through all of the spaced orifices of the crucible at a uniform rate to form adherent globules of molten glass on the underside of the base of the crucible, and it is from these globules that the filaments are produced by rapidly attenuating the glass. Viscosity control is attained by temperature control—too high a temperature results in a low viscosity and flooding of the glass from the crucible, while a low temperature and consequent high viscosity result in "freezing" of the glass at the orifices. The degree of temperature within the molten glass is usually in the range of 2000° F.–2500° F. for commercial filament production, the glass composition being prepared to yield a suitable viscosity at a temperature condition in about this range.

Metal crucibles are sufficiently heat conductive and have suitable characteristics to provide a useful substantially uniform temperature condition within a body of molten glass of a volume which is useful in commercial filament production; particularly the heat conductive metallic base attains a reasonably uniform overall temperature condition and the glass exuding through the orifices may accordingly be suitably controlled as to uniformity of temperature and viscosity. The objections of high initial cost, relatively short operating life, inability to handle all glasses, particularly those containing lead, and the cost of repairs however are inherent and highly undesirable inadequacies of these crucibles.

It is a primary object of this invention to provide a novel method for effecting the drawing of glass filaments, which method eliminates the necessity for utilizing metallic crucibles in filament drawing.

It is a particular object of this invention to describe a novel method for the pre-heating of glass for introduction in the molten state to the crucible of invention.

These and other allied objectives of the invention are attained by producing a crucible of a fire clay material such as a good grade of porcelain, mullite ($3Al_2O_3 \cdot 2SiO_2$) or sillimanite (an aluminum silicate) which latter is a naturally occurring material.

In the practice of the invention this fire clay crucible is heated by contact with gases which are burned in close proximity to the lateral walls of the crucible which walls are made very thin. The crucible for this operation is preferably supported on and surrounded by a body of refractory material which defines with the crucible a spacing in which the combustible gases are burned.

The lateral wall structure of the crucible as noted is very thin, about $3/16''$ having been found in the case of sillimanite to be suitable for the passage of heat to the glass within the crucible to render the same within at temperatures of about 2000° F.–2500° F. The base is also required to be sufficiently thin (about $3/16''$ in the case of sillimanite) and of such a width that it may be substantially uniformly heated thereacross by heat supplied thereto through the lateral walls of the crucible. These factors are extremely important for if the base is not sufficiently and uniformly heated the glass passing through the orifices of the base will be cooled unduly and also non-uniformly and may freeze—therefore the construction, arrangement and proportioning of the width and thickness of the base permit the attainment of the required conditions at the orifices and renders possible the use of these fire clay materials in filament formation.

It is to be noted in this connection that the temperature at the lateral wall of the crucible is limited by practical considerations and most important by the requirement that the viscosity and hence temperature of the molten body as a whole be maintained within limits suitable for fiber formation and be maintained uniform overall; hence the temperature induced by the combustion of the gases at the outer lateral wall of the crucible is limited and normally will be in the range of 3000° F.–3500° F. for those glasses which are utilizable in the commercial production of glass fibers; the combustion temperature may be lower, varying with the glass, but should always be at least several hundred degrees higher than the softening point of the glass.

The exact wall and base thickness and density will be variable somewhat with the particular fire clay utilized—thus mullite is a somewhat better conductor of heat than sillimanite and may be used in slightly greater thickness which gives added strength to the crucible. In all cases however the crucible is much thinner in wall and base section than those commercial pots used for melting glass (but not for drawing filaments and not apertured for such) which are purposely made sufficiently thick to prohibit material heat passage through the walls.

The crucible itself, as will be noted more particularly hereinafter, contains a relatively small volume of glass and additional raw glass is fed thereinto preferably in the form of marbles at periodic intervals which feeding is determined by the rate of withdrawal of the glass from the crucible in the formation of the filaments and fibers.

In one embodiment of the invention the entering glass is pre-heated by the waste or exhaust gases exiting from the combustion space and the apparatus is so constructed and arranged that the pre-heating liquifies the glass before its entry into the main body of molten glass within the crucible.

Where such pre-heating and fusion of the glass is employed the molten glass is of sufficient uniformity for the production of the finest commercial filaments; where the glass is added cold the uniformity is not as adequate for formation of filaments to be used as such commercially but is entirely suitable for forming filaments which are to be blown into commercial fibers.

A prime advantage of the crucible of invention is the low cost of manufacture for the crucible may be formed by known processes such as slip casting or by simply employing an aqueous slurry or suspension of the fire clay material and casting the same in an open plaster-of-Paris mold to permit deposition of the clay and concurrent absorption of water by the plaster; an excess of slurry is employed and when sufficient of the clay to form a thin wall has deposited this excess is poured off; the thickness of the wall may be accurately controlled by limiting the time of deposition.

When the "green" crucible has dried sufficiently it is transferred to a suitable furnace and the temperature is gradually raised to red heat over a period of hours, whereafter the clay is fired at about 1400° C.–1500° C. to produce a hard crucible of low porosity. The base of such a crucible which may be in conical, cylindrical or rectangular form is then accurately drilled to provide a plurality of orifices.

A further advantage of the invention is that where desired and where glasses containing lead are not a factor the clay crucible may be so constructed and arranged as to receive in the orifices thereof nipples of a metal such as platinum, which nipples permit a slightly greater bead of molten glass at the exit of the orifices than is attainable with many of the fire clays alone. Thus the advantages of the platinum and platinum alloy crucibles are attainable with the crucible of invention and at a much reduced cost.

The invention will be more fully understood by reference to the following detailed description and accompanying drawings wherein:

FIGURE 1 illustrates partially in section one embodiment of the invention and includes a showing of the crucible as a raw glass marble is about to be fed therein;

FIGURE 2 is a sectional view taken on line 2—2 of FIGURE 1;

FIGURE 3 is a sectional view of one embodiment of the crucible of invention;

FIGURE 4 is a sectional view taken on line 4—4 of FIGURE 3;

FIGURE 5 is a sectional view illustrating another embodiment of the invention;

FIGURE 6 is a view enlarged and partially in section of a metallic insert for use in a crucible having a construction such as that shown in FIGURE 5;

FIGURE 7 is an elevational view partly in section illustrating an arrangement of the crucible and surrounding refractory in which the crucible is of rectangular shape;

FIGURE 8 is a bottom view of the structure shown in FIGURE 7;

Figure 9:
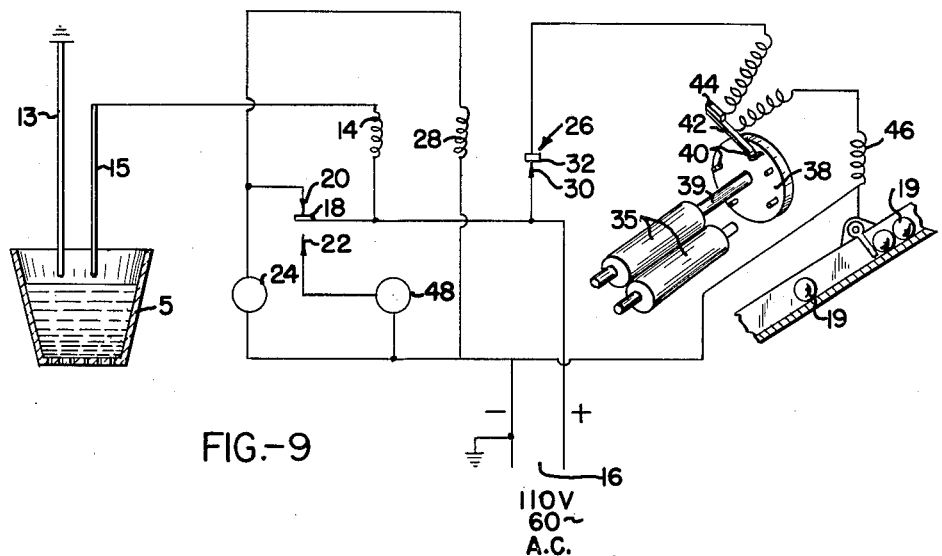
FIGURE 9 is a schematic illustration of the electrical circuit of invention applied to the glass melting crucible of FIGURE 1.

Referring to FIGURE 1 there is shown apparatus for the production of blown glass fibers.

This apparatus includes at 1 a body of refractory material which is surrounded by a supporting metal casing 3 and which itself centrally supports at an opening in the lower end thereof a conical crucible 5 of sillimanite. The body of refractory 1 is provided with inlet ports 7 for the passage of combustible gases to a combination chamber 9 defined by the upper portion of the crucible 5 and the refractory body 1.

The crucible 5 of sillimanite has a thin wall and base each being approximately 3/16" in thickness; the diameter or width at the glass melting level 17 is about 5", the diameter or width at the base about 3", and the height from the base to the glass melting level is about 5". The crucible volume while small is adequate for the commercial production of filaments and in this and smaller volumes the temperature and viscosity control required for such production are readily attained as described hereinafter. It is also to be noted that as long as the volume is retained relatively small the shape of the crucible may be cylindrical, cup-shaped or rectangular if desired.

The sillimanite crucible walls and base in the noted thicknesses conduct heat sufficiently well, are strong enough to readily support the weight of the molten glass and most important such a crucible is resistant to thermal shock and accordingly may be raised to operating temperature within a time comparable to that attained with platinum crucibles; thus the crucible specifically described may be raised to operating temperature in about 8–10 hours without danger of thermal spalling or cracking of the sillimanite.

The inlet ports 7 of the refractory body 1 are so arranged that the combustible gases are directed tangentially to the lateral surface of the conical crucible at substantially the height of the liquid level 17; the combustible gas is preferably an ordinary fuel gas, such as natural or a manufactured fuel gas, suitably mixed with the proper amount of air in commercially known mixer apparatus prior to being led to conduit 7. The gas mixture is introduced to combustion chamber 9 under a pressure of about 2 to 7 pounds per square inch and upon ignition provides a temperature of about 3000°–3500° F. These burning gases substantially contact the crucible wall substantially completely therearound and provide for maintaining the glass within the crucible molten. Also refractory 1 is heated by these gases and provides some heat by radiation and conduction to the crucible.

Positioned loosely on the upper side of the refractory 1 and metal casing 3, which are together about 1" to 1½" in thickness, are bricks 11 and the exhaust gases of the combustion pass upwardly therethrough to the atmosphere. These exhaust gases have a temperature in the range of 2500°–3000° F. and are useful for pre-melting entering fresh glass as will be discussed in connection with FIGURE 10.

Electrodes 13, 15 are supported in any suitable manner as by tie rods of insulating material (not shown) on the outer side of the apparatus; the electrodes extend through the bricks into the crucible 5 and are adapted to contact the molten glass when the same is at the liquid level 17 to complete an electrical circuit through the glass as will be more fully discussed in connection with FIGURE 9. However it is to be noted that the electrodes form a part of apparatus which governs the supply of fresh glass to the crucible 5 to replace glass withdrawn and that as shown in FIGURES 1 and 9 a glass marble 19 is being fed along ramp 21 from control gate 23 and hopper 25 in response to the demand of the apparatus for fresh material. The electrodes 13, 15 when out of the molten glass as shown in FIGURES 1 and 9 are the means for occasioning the flow of marbles to the crucible 5.

The sillimanite crucible 5 preferably is positioned well within the refractory body 1, usually about one inch in order to protect the orifices from transient air streams and maintain uniform temperature conditions. As shown in FIGURE 3 orifices 27 in concentric circular arrangement are provided in the base for the passing of the molten glass in thin streams through the passage of the refractory body and these streams form at the exit of the orifices 27 small globules of molten glass 29 from which filaments 31 are rapidly drawn over guide roll 33.

Drawing rolls 35 spaced below the guide roll 33 and at a convenient distance such that the glass is solidified before passing therethrough effect the drawing. The outer surface of these rolls are preferably rubber covered to effect frictional engagement with the glass and the shafts 37, 39 on which the rolls are supported are associated with the apparatus for the control of the feeding of the raw glass as also will be noted more particularly hereinafter in connection with the discussion of FIGURE 9.

The filaments 31 pass over a guide block 41 at the edge 43 thereof and are presented in parallel arrangement to the hot gaseous blast 45 of a burner 47 and the filaments are blown into fine fibers 49 which are collected on a belt strand indicated generally at 51 at the remote end of a conduit 53. For the purpose described the belt may be of a wire mesh and vacuum apparatus indicated generally at 55 may be applied to the belt to assist the deposition and collection of the fine fibers.

The gases burned within the burner 47 may suitably contain a mixture of air and natural gas similar to that set forth with respect to the gases of conduits 7.

To utilize the apparatus and crucible as described in connection with FIGURE 1 to secure fibers of commercial quality it is only necessary to replace the drawn glass in such a manner as not to unduly upset the temperature conditions existing within the crucible. Thus it is preferable to add only a small amount of glass at one time—that is a marble or two having a diameter of about ¾". These marbles will float and break up to a fluid condition at the surface of the molten glass which will normally be at approximately the liquid level 17—the preferable point of application of the combustible gases. Suitable apparatus for controlling the supply of the raw glass will as noted be described in connection with FIGURE 9.

A modification of the crucible form is shown in FIGURE 5 wherein the lateral wall 57 of the crucible is thin and the base 59 is slightly thicker, about ¼ of an inch, the base being countersunk as at 61 to provide orifices 63 for the passage of the molten glass. One of these orifices is shown to be provided with a metallic nipple 65 (FIGURE 6) which nipple has a hollow central portion 67 and a flanged portion 69 for engagement in the upper countersunk portion of the base 59 at orifice 63.

This metal insert is preferably of platinum or an alloy thereof which is resistant to molten glass. The insert, similarly to platinum crucibles, is not suitable for use with lead glasses but is of advantage in some instances as it provides a bead indicated at 71 (FIGURE 5) which is slightly larger than the bead normally attainable with the fire clay crucible alone. Similar nipples without the flange portion are useful in the orifices of the structure of FIGURE 3.

It is to be noted that it is preferable that the metallic nipple extend slightly below the bottom of the base 59, that is to an extent of about 1/16 to about 1/8 of an inch. Also this metallic insert is secured in position in operation by the glass itself which has been found upon removal of a crucible from operation to seal the metal to the clay as at 73 by flowing therearound and solidifying.

The countersunk feature described in connection with FIGURE 5 is important whether the base of the crucible be thicker than the lateral walls or not, for it permits control of the temperature of the glass flowing through the orifice by inhibiting a too rapid cooling thereof; the use or non-use of the countersunk feature will vary with the glasses employed and in general will be found to be useful where the glass must be operated at a temperature which is close to the devitrification point.

Referring now to FIGURES 7 and 8 there is illustrated at 75 a body of refractory brick which is spaced from and surrounds a crucible 77 of sillimanite and which is rectangular in shape, as may be most clearly noted from FIGURE 8. The orifices 79 are spaced longitudinally and preferably countersunk.

In this instance the combustible gases are passed into the spacing 81 between the refractory body 75 and the crucible 77 through inlet ports 83, 85 which ports are so arranged as to direct the flow of inlet gases directly along the side walls 87 in the direction indicated by the arrows. Such heating is essential in order to avoid cold spots along the walls which would contribute to non-uniformity of the temperature of the molten glass. A plurality of inlet conduits for the combustible gases may be provided if desired, although generally it will be sufficient to direct the flame along the crucible at about the height of the liquid level or slightly therebelow. A crucible such as that shown in FIGURE 7 made of sillimanite may suitably have a wall thickness of about 3/16", an overall width of about 4 inches, a length of about 5 inches and a molten glass depth of about 4 inches; it is not necessary to directly heat the ends of such a crucible as the gases readily flow thereto and radiation from the refractory wall is of assistance in heating—however such additional ports may be provided if desired.

Referring now to FIGURE 9 and the schematic illustration of the electrical circuit which is useful in the control of the flow of the marbles of raw glass to the fire clay crucible 5, electrode 13 is illustrated as being connected to ground while electrode 15 is connected to one side of a power line indicated generally at 16 through a relay having coil 14 and a movable contact 18 adapted to normally engage contact point 20 when the relay having the coil 14 is de-energized and to engage contact point 22 when the relay having the coil 14 is energized.

A lamp 24 is adapted to be lit in the de-energized condition of the relay for current flows from the grounded side of the power line 16 through the lamp 24, contact point 20, a commercial type spring biased movable contact 18 and back to the ungrounded side of the power line 16 conveniently illustrated and indicated as positive (+).

The relay having coil 14 is in de-energized condition when the glass in the crucible 5 does not make contact between the electrodes 13, 15, and the illumination of lamp 24 in this condition conveniently indicates to an operator that the level of the liquid in the crucible 5 is low. A relay generally indicated at 26 having a coil 28 and a contact point 30 is engageable with a fixed contact 32 when the coil 28 is energized which is the condition existing when lamp 24 is illuminated and when the movable contact 18 engages the fixed contact 20.

The shaft 39 of the drawing rolls 35 carries at one extremity a disc 38 provided with studs 40 which in combination with the spring arm 42 serve as a cam to tilt mercury switch 44 to cause the same to make contact when the coil 28 is energized. Thus with the condition as shown in FIGURE 9 and the crucible 5 requiring raw glass to be fed therein the rotation of the disc 38 as the drawing rolls draw glass from the crucible provides for the closing periodically of the switch 44 and the energizing of the coil 46 of the gate 23 (FIGURE 1) to permit the passage of the glass marbles 19 to the crucible.

The apparatus shown is adapted for slow rotation of the drawing rolls and disc 38; the disc 38 may be suitably geared to the drawing roll shaft where it is desired to drive the drawing rolls at higher speeds than the disc; thus the disc may be geared to rotate at very low speeds of 2 to 3 r.p.m. and number and spacing of the studs 40 on the disc 38 may be readily varied to control the periodic energization of the switch 44 and accordingly to control the flow of marbles to crucible 5. Also the disc may be driven completely independently of the drawing rolls if desired, as is usually the case at very high drawing speeds.

As a specific example employing marbles of ½" to ¾" of a glass which will melt within 30 seconds or less the disc may be provided with one stud and rotated at about 3 r.p.m. which when the glass level is low will supply about 3 marbles to the crucible in 1 minute at spaced intervals; at about a 4" diameter of the glass level the level will be raised about 1/8" by such addition of ½" marbles; the amount of glass drawn from the crucible in this time is so small as to permit it to be neglected in this specific consideration of the operation. The spacing of the supply to the crucible permits one marble to be substantially completely melted before another is added.

When sufficient marbles have been added, usually only two or three at the most with the apparatus as previously described, contact will be made by the glass between the inner ends of electrodes 13, 15 which will cause the coil 14 to be energized, the contact between contact points 18 and 20 to be broken, and contact to be made between the movable contact 18 and the contact 22. The making of the circuit through the contact 22 places lamp 48 across the power line to cause the same to be illuminated to indicate to an operator the liquid level within the crucible 5 is satisfactory.

This liquid level may be so controlled with the apparatus described in connection with FIGURES 1 and 9 that the total variation in height of the level is usually 1/8" or less and not more than 3/16", the variation being dependent to some extent upon the nature of the glass, the diameter of filament drawn, and the rate of drawing. A variation of 3/16" with a substantially full crucible does not materially affect drawing conditions.

It is to be noted that when the lamp 48 is illuminated the coil 28 is de-energized due to the breaking of the circuit at the movable contact 18 and that accordingly there is no contact between 30 and 32 under this condition. Therefore while the disc 38 continues to rotate with the shaft 39 and the drawing rolls 35, and while the mercury switch 44 on the arm 42 is tilted in the customary way, no power is applied to the switch and accordingly none is transmitted to the coil 46 and therefore no marbles flow to the crucible 5.

Referring now to the structure shown in FIGURE 10 wherein similar numerals are employed primed to indicate components similar to those described in connection with FIGURE 1, the embodiment shown is specifically adapted for the drawing of fine filaments and the use in filamentary form rather than the blown fiber production described in connection with FIGURE 1. In this connection it is to be noted that where blown fibers are to be formed for usual commercial purposes, it is not necessary for the diameter of the filaments to be as accurately controlled as when the filaments are not to be blown. Accordingly the structure now to be described in connection with FIGURE 10 is designed specifically for more accurate control of the temperature of the material in the crucible 5' than is attainable with the embodiment of FIGURE 1.

Figure 10:
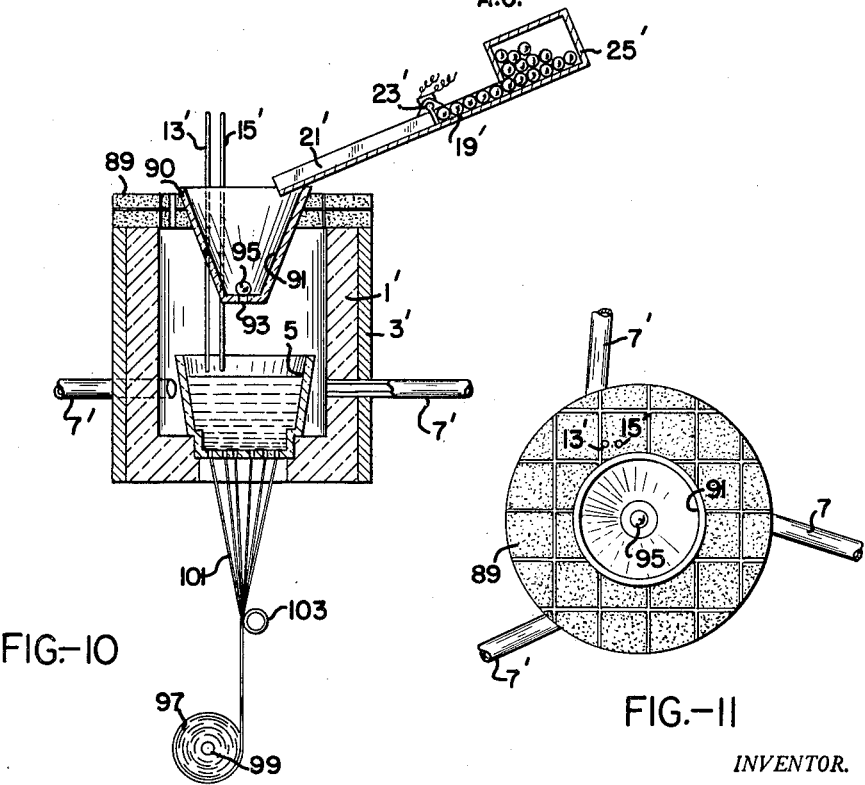
FIGURE 10 illustrates a further embodiment of the invention which is particularly useful for the formation of fine uniform filaments.
Figure 11:
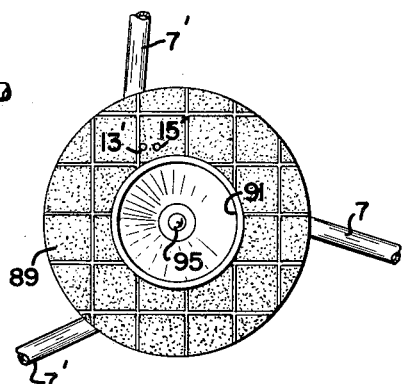
FIGURE 11 is a plan view of the structure of FIGURE 10.

Referring now specifically to FIGURES 10 and 11 a body of refractory material 1' having a metallic casing 3' surrounds and is spaced from the crucible or fire clay or Sillimanite 5' which is provided with electrodes 13', 15' extending through conveniently placed supporting bricks 89 which engage an upper clay crucible 91 having a single aperture 93 in the base thereof. These bricks may also be loosely spaced being in contact with the crucible 91 only sufficiently to support the same or alternatively the bricks and crucible together may substantially close the top, a vent being provided for the escape of the exhaust gases of combustion.

The crucible 91 extends well into the refractory body 1' and the aperture 93 and a marble 95 are conveniently exposed to the waste gases of combustion passing upwardly to exhaust through the brick work 89 of FIGURES 10 and 11; the fuel gas for combustion enters through conduits as at 7' and the gases are directed tangentially to the surface of the crucible 5'.

The electrical circuit arrangement for the control of the flow of glass is similar to that described in connection with FIGURES 1 and 9, and in this instance the winding rolls 97 having a shaft 99 may serve as the mounting for the cam disc of the electrical circuit shown at 38 in FIGURE 9. Accordingly it is not considered necessary to refer more specifically to the electrical circuit arrangement in connection with FIGURES 10 and 11.

It is however to be noted that the crucible 5' of FIGURE 10 has what may be considered a countersunk base; this arrangement is important as it prevents gases of the combustion chamber from leaking to the face to the base and burning the filaments as they form, thus the face of the base is sealed from the chamber.

In the operation of the structure shown in FIGURES 10 and 11, which is vented at 90, the glass marbles are melted at the aperture 93 and as the molten material thereof flows directly into the molten material in the crucible 5', there is accordingly substantially no change in temperature by the introduction of the glass to the body of molten material from which the filaments are drawn.

In the instance shown in FIGURE 10 the filaments 101 are gathered together in a manner known to the art at 103 and the combined strand is wound up on the winding roll or drum 97; the material on the drum 97 may then be subjected to further processing or to packaging in the usual manner of the art.

It is important to note that in each of the primary embodiments of the apparatus described the glass within the thin walled crucible of fire clay is very uniformly heated and accordingly the flow through the orifices is uniform, permitting the production of uniform diameter filaments. This is particularly true of the structure of FIGURE 10 wherein there is substantially no cooling effect when new glass is fed to the molten material in the crucible.

It is further to be noted that since the crucible 91 is of fire clay that the whole apparatus is particularly suitable for the melting of lead glasses in direct contrast to platinum which would be destroyed by such glass.

The constructions of crucibles thus described are extremely cheap to manufacture and accordingly the cost of producing fine fibers and filaments on a commercial basis is materially reduced.

Such ceramic and fire clay crucibles have greater utility than the platinum and alloy crucibles due to their ability to handle lead glasses without detriment to the crucible. Maintenance and repair costs are eliminated since the ease of crucible production and the low cost permit the discarding of damaged crucibles.

These many advantages stem from the provision of the crucible itself as well as the combination of the crucible with the means to control the glass temperature to such a degree of uniformity that the fiber and filament diameters are accurately controllable to the same extent as with the metal crucibles.

From the operational point of view the glass depth within the crucible should be maintained within certain limits in order to avoid "freezing" of the glass at the orifices and to avoid at the other end of the scale an undue flow of molten glass. If desired pressure may be applied to the liquid level of the glass in accordance with known principles; however if the glass depth is maintained at greater than about 1" and less than about 5" substantially all glasses of commercial fiber-forming importance may be utilized; with special compositions such as a sodium silicate ($Na_2O$—$4SiO_2$) which is molten at about 1800° F. it is preferable to maintain the depth at somewhat less, that is about 3 to 4 inches to avoid excessive flow. However the particular level even with glass operable at the lower temperatures may be maintained within the hereinbefore noted limits with the apparatus of invention.

Preferred crucibles which have very satisfactory performance characteristics are substantially cylindrical and have dimensions in one instance of 4" diameter by 3" high and in another of 6" diameter by 3" high.

The term "commercial quality" as employed herein is to be understood to mean that the product attainable with the apparatus of invention falls within the commercial standards of the industry. Thus AA or AAA fibers may be readily produced as required with no other considerations than would be necessary with the metal crucibles; it may be noted however that where possible, that is where the glass is not corrosive to metal, and where the finer filaments or fibers are being produced the metal nipples may be suitably employed as they permit of a somewhat finer control than the ceramic or fire-clay orifices; the actual orifice opening in any event should be similar to that for metal crucibles—for example approximately 1/32″ to give an appropriate bead for the drawing of a filament of 0.00021 in. in diameter.

It will be understood that this invention is susceptible to modification in order to adopt it to different usages and conditions and accordingly, it is desired to comprehend such modifications within this invention as may fall within the scope of the appended claims.

I claim:

1. A process of forming glass filaments, comprising establishing a body of molten glass within a glass melting crucible, heating the crucible to maintain the glass therein in molten condition by subjecting the exterior of the crucible to the heat of gaseous combustion products, withdrawing filaments of glass from the body of molten glass through orifices in the base of the crucible, supporting solidified raw glass above the crucible, directing the exhaust of the gases employed to heat the crucible into contact with the raw glass supported above the crucible to melt the raw glass and cause it to flow downwardly and commingle with the molten glass contained in the crucible, and maintaining the volume of glass flow to the crucible substantially equivalent to the volume withdrawn therefrom.

2. A process of forming glass filaments, comprising establishing a body of molten glass within a glass melting crucible, heating the crucible to maintain the glass therein in molten condition by subjecting the exterior of the crucible to the heat of gaseous combustion products, exhausting the hot gaseous products upwardly around the crucible, supporting raw glass above the crucible in the path of the upwardly moving hot exhaust gases to cause the raw glass to become molten, positioning the raw glass so that the molten glass formed therefrom will fall into the body of molten glass contained in the crucible, withdrawing filaments of glass from the molten body, and maintaining the volume of glass flow to the crucible substantially equivalent to the volume withdrawn therefrom.

References Cited in the file of this patent

UNITED STATES PATENTS

| | | |
|---|---|---|
| Re. 20,828 | Powell | Aug. 16, 1938 |
| 1,049,314 | Neil | Dec. 31, 1912 |
| 1,968,693 | Kroger et al. | July 31, 1934 |
| 2,267,019 | Esser | Dec. 23, 1941 |
| 2,453,864 | Schlehr | Nov. 16, 1948 |
| 2,465,283 | Schlehr | Mar. 22, 1949 |
| 2,482,071 | Simison | Sept. 13, 1949 |
| 2,495,956 | Cook | Jan. 31, 1950 |
| 2,514,627 | Cook | July 11, 1950 |

FOREIGN PATENTS

| | | |
|---|---|---|
| 461,125 | Canada | Nov. 15, 1949 |
| 167,754 | Switzerland | May 16, 1934 |